United States Patent [19]

Suzuki

[11] Patent Number: 4,566,554
[45] Date of Patent: Jan. 28, 1986

[54] FOUR WHEEL DRIVE SYSTEM WITH CENTER DIFFERENTIAL UNLOCK CONTROL RESPONSIVE TO STEERING ANGLE

[75] Inventor: Kunihiko Suzuki, Sagamihara, Japan

[73] Assignee: Nissan Motor Co., Ltd., Japan

[21] Appl. No.: 597,707

[22] Filed: Apr. 16, 1984

[30] Foreign Application Priority Data

May 9, 1983 [JP] Japan .................................. 58-81583

[51] Int. Cl.⁴ ............................................ B60K 17/35
[52] U.S. Cl. ..................................... 180/249; 180/247
[58] Field of Search ............... 180/248.76, 249, 24.1, 180/297, 247, 250, 233

[56] References Cited

U.S. PATENT DOCUMENTS 3,351,147 11/1967 Williamson ......................... 180/248
4,298,085 11/1981 Moroto et al. ..................... 180/249
4,417,641 11/1983 Kageyama ............................ 180/76
4,470,489 9/1984 Makita .................................. 180/247

FOREIGN PATENT DOCUMENTS 57-114727 7/1982 Japan .

Primary Examiner—James C. Yeung
Attorney, Agent, or Firm—Lane and Aitken

[57] ABSTRACT

A four-wheel drive system has a center differential between front and rear wheels, and means of restraining or locking the center differential. The four-wheel drive system is equipped with a control system for automatically unlocking the center differential when the steering angle becomes equal to or larger than a predetermined angle. The control system may further have a vehicle speed sensor. In this case, the control system unlocks the center differential only when the vehicle speed is equal to or lower than a predetermined speed.

11 Claims, 6 Drawing Figures

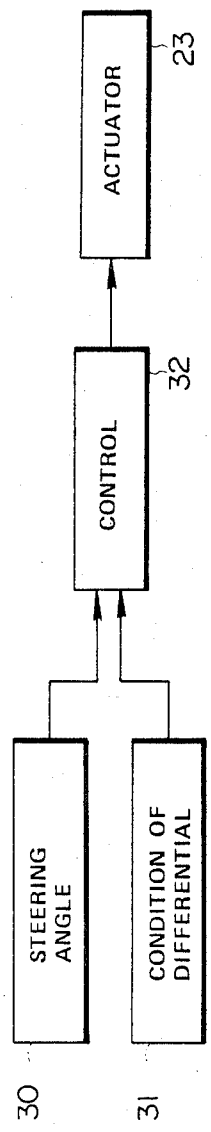
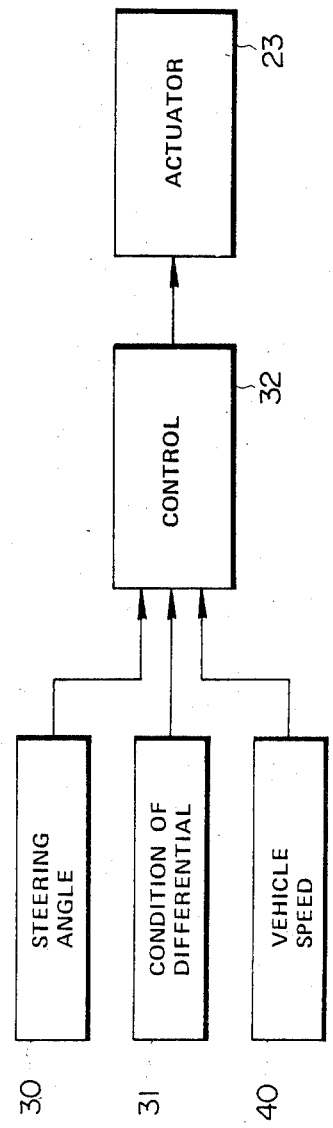

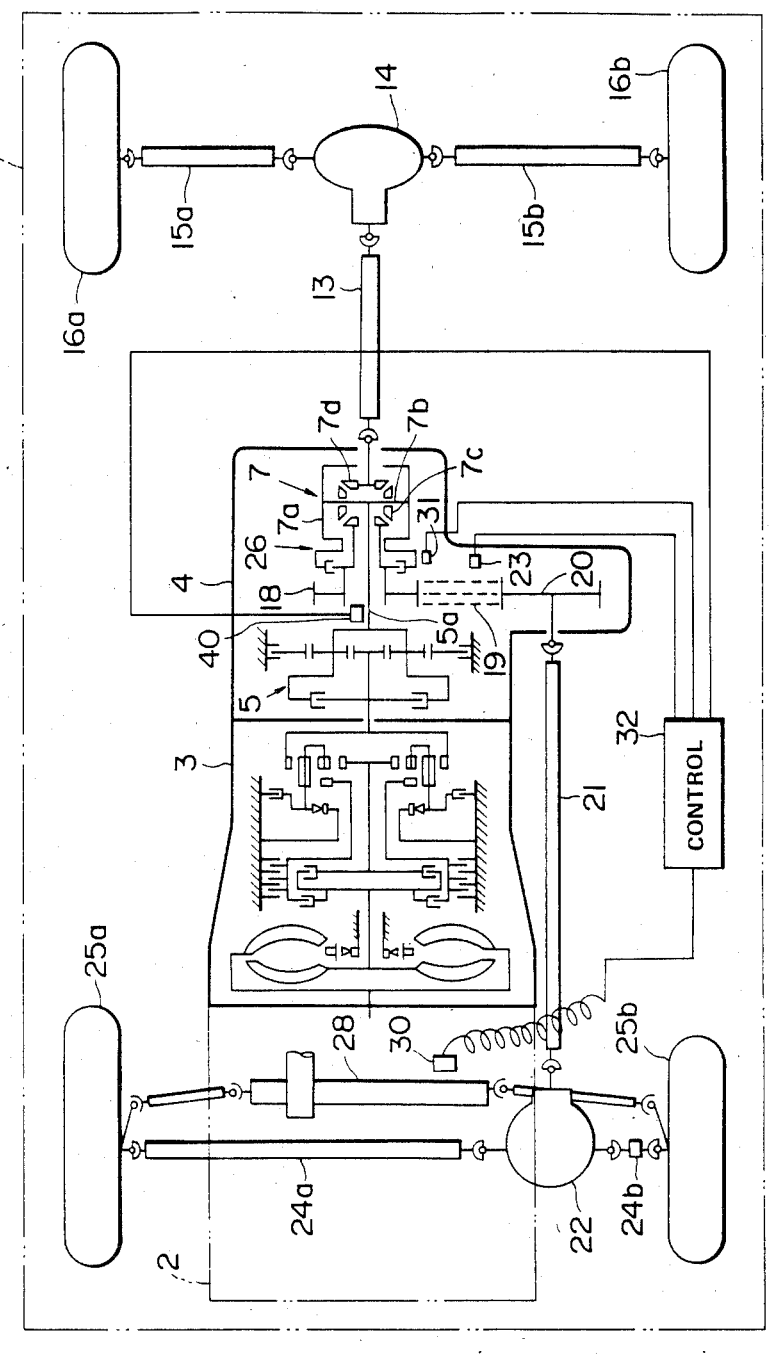

FOUR WHEEL DRIVE SYSTEM WITH CENTER DIFFERENTIAL UNLOCK CONTROL RESPONSIVE TO STEERING ANGLE

BACKGROUND OF THE INVENTION

The present invention relates to a four-wheel drive motor vehicle of a type having a center differential between the front and rear wheels, and means for restraining or locking the center differential. More specifically, the present invention relates to a control system for unlocking a center differential of a four-wheel drive system in accordance with a steering angle of the steerable wheels.

A four-wheel drive vehicle is superior in ability of hill climbing and ability of rough road driving. If, however, all four wheels are always driven at the same speed, a four-wheel drive vehicle cannot be turned smoothly. During a turn with a large steering angle of steerable wheels, the front wheel of an inner or outer side must travel along a circle having a large radius and the rear wheel of the same side must travel along a small circle. Because of this difference in turning radius, there arises a large difference between a rotation speed (an average rotation speed, to be exact) of the front wheels and a rotation speed (an average rotation speed) of the rear wheels. As a result, the steering becomes heavy, the tendency to understeer is increased, and the vehicle cannot be turned without abnormal tire friction (called tight corner brake) which tends to brake the vehicle and cause an engine stall.

To overcome these handling and tire friction problems, some four-wheel drive systems use a center differential between front and rear wheels. If, however, one of the four wheels run on a muddy place, the center differential coacts with a rear or front differential between right and left wheels, so that the torque cannot be transmitted to the other three wheels, and the vehicle cannot escape from the muddy place.

In view of this problem, some four-wheel drive systems are further provided with means (a lockup mechanism or a non-slip differential mechanism) for locking the center differential. One example is shown in Japanese patent provisional publication No. 57-114727.

However, a four-wheel drive vehicle of this type is very difficult to control especially for the average driver having no special skill. If a four-wheel drive vehicle of this type is turned at a large steering angle without unlocking the center differential, abnormally great torques are exerted on ends of front and rear propeller shafts and axle shafts which transmit power to the front wheels and the rear wheels. Therefore, the steering of the vehicle becomes heavy, and there arises a danger of damage to the propeller shafts and axle shafts. Furthermore, the front wheels and the rear wheels slip in the opposite directions during a turn, so that the tendency to understeer is increased and the effect of tight corner brake is produced. The average driver cannot understand the reason for such an abnormal behavior of the vehicle, and cannot negotiate a corner smoothly.

SUMMARY OF THE INVENTION

It is an object of the present invention to provide a four-wheel drive vehicle of a type having a center differential, which can be turned smoothly, easily and safely.

According to the present invention, a four-wheel drive vehicle comprises an engine, front and rear wheels, a four-wheel drive system and a control system. The four-wheel drive system is capable of transmitting power from the engine to the front wheels and the rear wheels. The four-wheel drive system comprises a center differential connected between the front wheels and the rear wheels for absorbing a rotational speed difference between the front wheels and the rear wheels, and center differential restraining means capable of holding the center differential in a first condition in which the function of the center differential is prevented and in a second condition in which the center differential is released. The control system comprises means for sensing a steering angle of at least one steerable wheel of the vehicle, condition sensing means for detecting whether said center differential is in the first condition or not, and control means connected with the steering angle sensing means and the condition sensing means for controlling the center differential by actuating the restraining means in accordance with signals of the steering angle sensing means and the condition sensing means. The control means is arranged to command the center differential restraining means to bring the center differential from the first condition toward the second condition if the sensed steering angle is equal to or larger than a predetermined angle and at the same time the center differential is in the first condition.

The restraining means may be arranged to bring the center differential gradually from the first condition toward the second condition when commanded by the control means. The control system may further comprises a vehicle speed sensing means. In this case, the control means is connected with the vehicle speed sensing means, and arranged to release the center differential only when the vehicle speed is equal to or lower than a predetermined speed.

BRIEF DESCRIPTION OF THE DRAWINGS

FIG. 4 is a block diagram of a control system of the first embodiment, FIG. 5 is a schematic view of a four-wheel drive vehicle of a second embodiment of the present invention, FIG. 6 is a block diagram of a control system of the second embodiment.

DETAILED DESCRIPTION OF THE INVENTION

Figure 2:
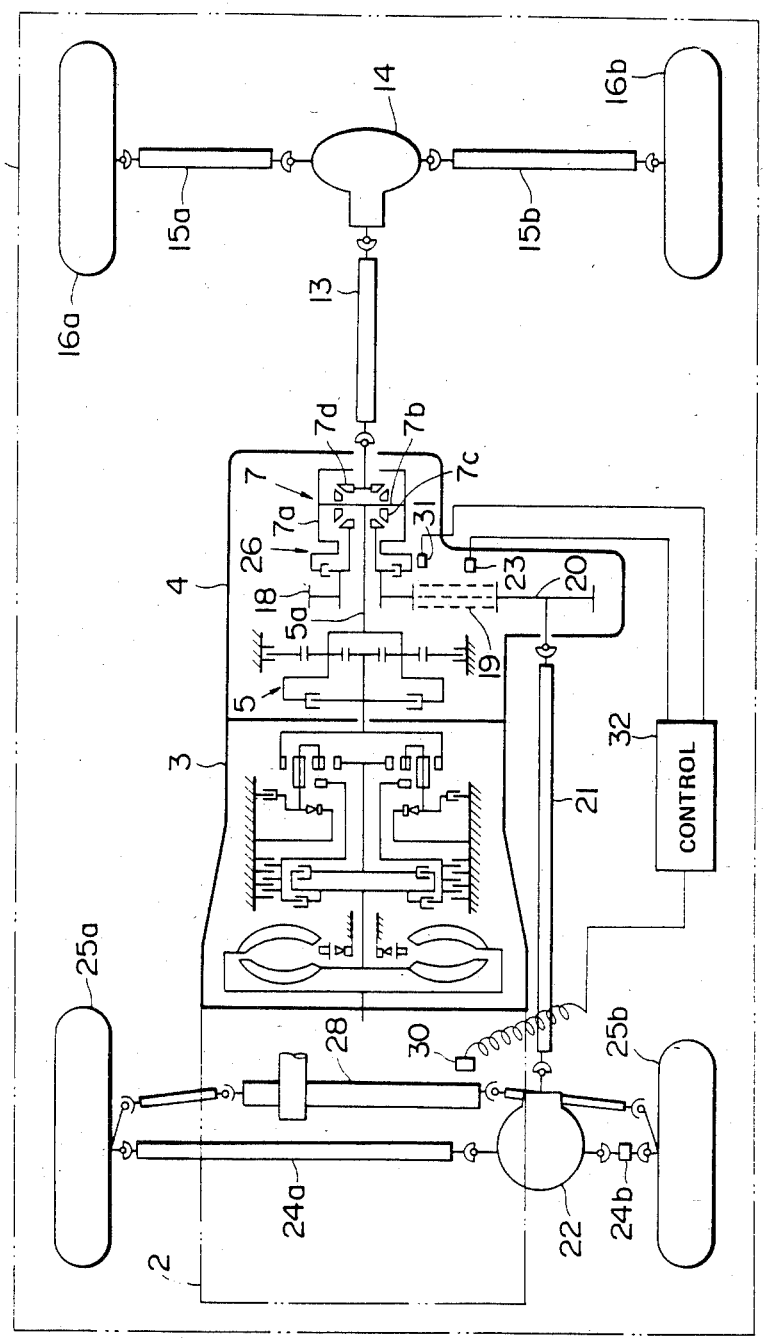
FIG. 2 is a schematic view of a four-wheel drive vehicle of a first embodiment of the present invention.

A first embodiment of the present invention is shown in FIG. 2. An engine 2 is supported on a vehicle body 1. The engine is connected to a main transmission 3. The main transmission 3 is connected to a secondary transmission 4. The secondary transmission 4 has a high-low two-speed change unit 5. The main transmission 3 is connected to the high-low change unit 5 of the secondary transmission 4. The high-low change unit 5 has an output shaft 5a. The secondary transmission 4 further has a center differential unit 7. The output shaft 5a of the high-low unit 5 is connected to the center differential unit 7. The center differential unit 7 has a differential case 7a, a pinion shaft 7b fixed to the differential case 7a, two differential pinions 7c rotatably mounted on the pinion shaft 7b, and first and second side gears 7d which mesh with the differential pinions 7c, respectively.

The first side gears 7d is connected to one end of a rear propeller shaft 13. The other end of the rear propeller shaft 13 is connected with a rear differential unit 14. The rear differential unit 14 is connected to rear wheels 16a and 16b through rear axle shafts 15a and 15b. The rear differential unit 14 allows the right and left rear wheels 16a and 16b to rotate at different speeds, and thereby absorbs a rotational speed difference between the right and left rear wheels 16a and 16b.

The second side gear 7d of the center differential unit 7 is connected with a first chain wheel 18 placed coaxially with the second side gear 7d. The first chain wheel 18 is connected with a second chain wheel 20 by a chain belt 19. A shaft of the second chain wheel 20 is connected with one end of a front propeller shaft 21. The other end of the front propeller shaft 21 is connected to a front differential unit 22. The front differential unit 22 is connected with front wheels 25a and 25b through front axles 24a and 24b, respectively. The front differential unit 22 allows the right and left front wheels 25a and 25b to rotate at different speeds, and thereby absorbs a rotational speed difference between the right and left front wheels 25a and 25b.

Figure 3:
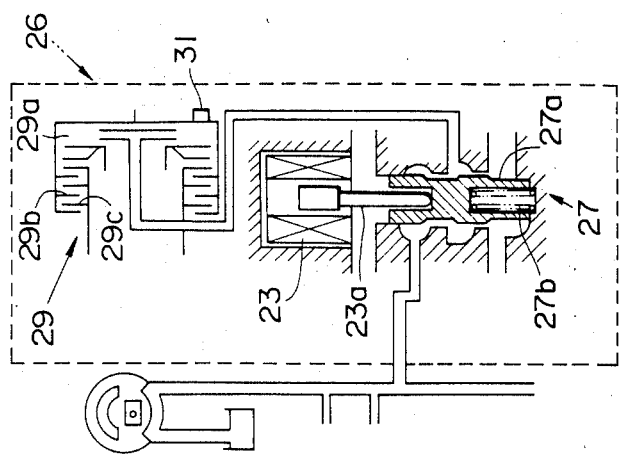
FIG. 3 is a fragmentary sectional schematic view of a center differential restraining means used in the vehicle of FIG. 2.

The secondary transmission 4 further has a center differential restrain unit 26 disposed between the differential case 7a of the center differential unit 7 and the first chain wheel 18. As shown in FIG. 3, the center differential restrain unit 26 has a center differential control valve 27 connected with a hydraulic system of the vehicle such as the hydraulic system of the transmission 3. The center differential control valve 27 has a spool 27a. The center differential restrain unit 26 further has a solenoid 23 having an iron core 23a for moving the spool 27a. The solenoid 23 serves as an actuator of a control system. The center differential restrain unit 26 further has a hydraulic type multiple disc clutch 29. The clutch 29 is operated by an oil pressure of an oil chamber 29a. The oil chamber 29a is fluidly connected with a port of the center differential control valve 27. The multiple disc clutch 29 has a group of first clutch plates 29b and a group of second clutch plates 29c. One of the two groups is connected with the differential case 7a of the center differential unit 7. The other is connected with the first chain wheel 18. The center differential control valve 27 can move the spool 27a with the iron core 23a in accordance with the current passing through the solenoid 23, and thereby control the fluid pressure in the oil chamber 29a by controlling the fluid flow. The clutch 29 is frictionally engaged when the oil pressure in the oil chamber 29a is high. The clutch 29 is in a slipping state when the oil pressure in the oil chamber 29a is low. The clutch 29 is disengaged when the oil is drained from the oil chamber 29a.

The vehicle further has a steering mechanism or means 28 connected with the steerable front wheels 25a and 25b. The steering means 28 is moved by a steering wheel of the vehicle (not shown).

A steering angle sensor 30 is mounted on the vehicle body 1 near the steering means 28. The steering angle sensor 30 can sense a steering angle of the front wheels 25a and 25b by sensing rightward and leftward movements of the steering means 28.

There is further provided a sensor 31 for detecting the condition of the center differential 7. In this embodiment, the differential condition sensor 31 detects whether the clutch 29 is engaged or not by monitoring the oil pressure in the oil chamber 29a.

A control unit or circuit 32 is connected with the differential condition sensor 31 and the steering angle sensor 30 for receiving signals from both of the sensors 31 and 30. The control circuit 32 produces a control signal in accordance with the signals of both sensors, and send the control signal to the solenoid (actuator) 23. Thus, a control system is formed as shown in FIG. 4.

Figure 1:
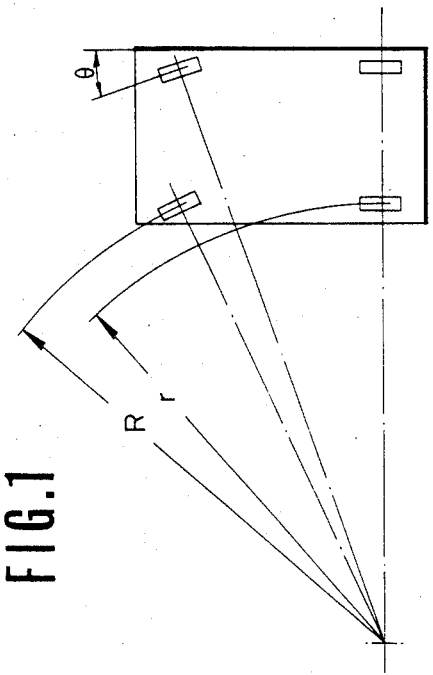
FIG. 1 is a plan view of a vehicle, for showing a turning radius difference between front wheels and rear wheels when steering angles of steerable wheels are large.

When the center differential restrain unit 26 is not actuated, the center differential unit 7 works in the following manner. When the steering angle $\theta$ of the steerable front wheels 25a and 25b are increased, the radii (R) of arc-shaped paths traveled by the front wheels 25a and 25b become largely different from the radii (r) of arc-shaped paths traveled by the rear wheels 16a and 16b, as shown in FIG. 1. In FIG. 1, only the paths of the inside front and rear wheels are shown. Consequently, there arises a large difference between an average rotation speed of the front wheels 25a and 25b and an average rotation speed of the rear wheels 16a and 16b. The center differential 7 in its released state absorbs this average rotation speed difference between the front and rear wheels, so that the vehicle can turn smoothly though the steering angle $\theta$ is large.

If either the front wheels 25a, 25b or the rear wheels 16a, 16b are stuck in a muddy ground, and accordingly the other wheels lose their power for driving the vehicle, it is possible to move this vehicle out of the muddy ground by actuating the center differential restrain unit 26 to lock the center differential unit 7. When the center differential restrain unit 26 is actuated, the oil pressure in the oil chamber 29a is increased, and the clutch 29 is engaged. Accordingly, the function of the center differential unit 7 is restrained or prevented, so that the power of engine can be transmitted to the other wheels, and the vehicle can escape from the muddy ground.

If the vehicle restarts to run on a normal road without restoring the center differential restrain unit 26 to a position to unlock the center differential 7, and the steering angle of the steerable front wheels 25a and 25b is made equal to or larger than a predetermined angle, then the steering angle sensor 30 detects that the steering angle becomes equal to or larger than the predetermined angle, and at the same time the condition sensor 31 is detecting that the center differential restrain unit 26 is held actuated and the clutch 29 is held engaged. Thus, the signals of the steering angle sensor 30 and the condition sensor 31 are inputted to the control unit 32, which, in turn, sends its control signal to the solenoid or actuator 23 to command the center differential restrain unit 26 to unlock the center differential unit 7. In response to the control signal, the current supply to the solenoid 23 is gradually decreased and stopped, and accordingly the center differential control valve 27 gradually decreases the oil pressure of the oil chamber 29a by moving the spool 27a upwards in FIG. 3. When the oil pressure of the oil chamber 29a is gradually decreased, the clutch 29 begins slipping, and a frictional force of the clutch 29 which acts to restrain the function of the center differential unit 7 is gradually decreased. Finally, the oil is drained from the oil chamber 29a, and the clutch 29 is disengaged, so that the center differential unit 7 is released, and regains its function to absorb a speed difference between the front wheels and the rear wheels. Thus, the clutch 29 is disengaged gradually with the interposition of a slippingly engaged condition. This maintains the steering stability of the vehicle by preventing an abrupt change of the cornering characteristic of the vehicle. In this way, the center differential unit 7 is automatically released, and the vehicle can be turned smoothly through the action of the center differential unit 7. This control system can prevent the propeller shafts 13 and 21 and the axle shafts 15a, 15b, 24a and 24b from suffering from an abnormally large torque which would be produced if the center differential 7 remains locked. This control system, therefore, can prevent the steering of the vehicle from becoming heavy and avoid the danger of damage to these shafts. Furthermore, this control system can prevent the front wheels 25a and 25b and the rear wheels 16a and 16b from slipping in the opposite directions during a turn, so that the tendency to understeer and the tight corner brake can be prevented. This four-wheel drive vehicle is easy to control and very suitable to the average driver.

A second embodiment of the present invention is shown in FIG. 5. In the second embodiment, there is further provided a vehicle speed sensor 40. The vehicle speed sensor 40 senses the speed of the vehicle by sensing the rpm of the output shaft 5a of the high-low change unit 5. When the center differential 7 is locked, the vehicle turns with the tendency to understeer due to the effect of the tight corner brake. When the center differential 7 is not locked, it absorbs the rotational speed difference between the front and rear wheels, and accordingly the vehicle turns in the condition of neutral steer. Thus, the cornering behavior of the vehicle is changed depending upon whether the center differential 7 is locked or not. If the cornering characteristic of the vehicle is changed while the vehicle is turning at high speeds, there is a great possibility that the vehicle becomes oversteer, or the directional control of the vehicle is lost. In order to avoid such a danger and ensure the safety of the vehicle, the control system of the second embodiment is arranged to unlock the center differential 7 only when the vehicle speed is equal to or lower than a predetermined speed. As shown in FIG. 6, the control unit 32 of the second embodiment is connected with the steering angle sensor 30, the condition sensor 31 and the vehicle speed sensor 40 to receive the signals from these sensors. If (1) the steering angle of the front wheels 25a and 25b is equal to or larger than the predetermined angle, (2) the center differential restrain unit 26 is actuated to lock the center differential 7, and (3) the vehicle speed is equal to or lower than the predetermined speed, then the control unit 32 sends the control signal to the solenoid 23, and commands the center differential restrain unit 26 to disengage the clutch 29 and unlock the center differential 7. Thus, this control system can ensure the safety of the vehicle by preventing the center differential restrain unit 26 from unlocking the center differential 7 while the vehicle is running at a speed higher than the predetermined speed.

What is claimed is:

1. A four-wheel drive vehicle comprising:
an engine,
front wheels and rear wheels,
a four-wheel drive system for transmitting power from said engine to said front wheels and said rear wheels, said four-wheel drive system comprising a center differential, connected between said front wheels and said rear wheels, for absorbing a rotational speed difference between said front wheels and said rear wheels, and center differential restraining means capable of holding said center differential in a first condition in which the function of said center differential is restrained and in a second condition in which said center differential is released, and
a control system comprising:
means for sensing a steering angle of at least one steerable wheel of the vehicle,
condition sensing means for detecting whether said center differential is in said first condition or not, and
control means, connected with said steering angle sensing means and said condition sensing means, for controlling said center differential by actuating said center differential restraining means in accordance with signals of said steering angle sensing means and said condition sensing means, said control means being arranged to command said center differential restraining means to bring said center differential from said first condition toward said second condition if the sensed steering angle is equal to or larger than a predetermined angle and at the time said center differential is in said first condition,
said center differential comprising a front-side rotating member connected to said front wheels for driving said front wheels and a rear-side rotating member connected to said rear wheels for driving said rear wheels, said center differential being capable of allowing said front-side and rear-side rotating members to rotate at different speeds, said front-side and rear-side rotating members being prevented from rotating at different speeds when said center differential is in said first condition.

2. A vehicle according to claim 1, wherein said restraining means is arranged to bring said center differential gradually from said first condition toward said second condition when commanded by said control means.

3. A vehicle according to claim 2, wherein said restraining means comprises a friction clutch operated by a fluid pressure, said clutch holding said center differential in said first condition when said clutch is engaged, and in said second condition when said clutch is disengaged.

4. A vehicle according to claim 3, wherein said clutch is completely engaged when the fluid pressure is within a first range, disengaged when the fluid pressure is within a second range, and slippingly engaged when the fluid pressure is within a range intermediate between said first range and said second range.

5. A vehicle according to claim 4, wherein said condition sensing means detects the condition of said center differential by monitoring the fluid pressure for operating said clutch.

6. A vehicle according to claim 5, wherein said control means is arranged to command said restraining means to vary the fluid pressure gradually to said second range if the sensed steering angle is equal to or larger than the predetermined angle and at the same time the fluid pressure is within said first range or said intermediate range.

7. A vehicle according to claim 6, said front-side and rear-side rotating members are side gears, said center differential further comprising a differential case, and differential pinion gears which are mounted in said differential case and mesh with said side gears, said clutch being provided between said differential case and said front-side rotating member.

8. A vehicle according to claim 7, wherein said four-wheel drive system further comprises a front differential disposed between said front wheels, and a rear differential disposed between said rear wheels.

9. A vehicle according to claim 8, wherein said restraining means further comprises a solenoid valve for controlling the fluid pressure.

10. A vehicle according to claim 1, wherein said control means further comprises means for sensing a speed of the vehicle, and said control means is connected with said vehicle speed sensing means and arranged to command said restraining means to bring said center differential from said first condition toward said second condition only when the sensed speed of the vehicle is equal to or lower than a predetermined speed.

11. A vehicle according to claim 2, wherein said control means further comprises means for sensing a speed of the vehicle, and said control means is connected with said vehicle speed sensing means and arranged to command said restraining means to bring said center differential from said first condition toward said second condition only when the sensed speed of the vehicle is equal to or lower than a predetermined speed.

* * * * *